United States Patent [19]

Campbell et al.

[11] 4,216,125

[45] Aug. 5, 1980

[54] DETERGENT COMPOSITIONS WITH SILANE-ZEOLITE SILICATE BUILDER

[75] Inventors: Thomas C. Campbell, Paoli, Pa.; Elliot P. Hertzenberg, Wilmington, Del.; Howard S. Sherry, Cherry Hill, N.J.

[73] Assignee: PQ Corporation, Valley Forge, Pa.

[21] Appl. No.: 967,537

[22] Filed: Dec. 7, 1978

Related U.S. Application Data

[63] Continuation-in-part of Ser. No. 842,425, Oct. 14, 1977, abandoned.

[51] Int. Cl.[2] ........................ C01B 33/28; C02B 1/44; C11D 3/08; C11D 3/12

[52] U.S. Cl. .................................... 252/527; 252/135; 252/140; 252/155; 252/174.25; 252/179; 252/539; 252/540; 252/529

[58] Field of Search ............... 252/131, 135, 140, 155, 252/179, 430, 455 Z, 527, 546, 523, 525, 174.25; 210/38 A; 423/328

[56] References Cited

U.S. PATENT DOCUMENTS

| | | | |
|---|---|---|---|
| 3,962,132 | 6/1976 | Haschke | 252/430 |
| 3,969,261 | 7/1976 | Meiller | 252/179 |
| 3,985,669 | 10/1976 | Krummel | 252/116 |
| 4,000,094 | 12/1976 | Fleming | 252/557 |
| 4,019,999 | 4/1977 | Ohren | 252/140 |
| 4,066,394 | 1/1978 | Leonard | 8/137 |
| 4,072,621 | 2/1978 | Rose | 252/179 X |
| 4,088,593 | 5/1978 | Roebke | 252/179 X |
| 4,092,261 | 5/1978 | Sperling | 252/131 |
| 4,096,081 | 6/1978 | Phenicie | 252/179 X |
| 4,138,363 | 2/1979 | Hertzenberg | 252/430 |

*Primary Examiner*—Dennis L. Albrecht
*Attorney, Agent, or Firm*—Ernest G. Posner; J. S. Stephen Bobb; Fred C. Philpitt

[57] ABSTRACT

Silane-Zeolite composites are incorporated into phosphate free detergents as builders. The use of such composites allows compositional improvements and results in certain process advantages when compared to detergents utilizing plain zeolites as phosphate replacements. Hydrated zeolites which have been treated with functionally hydrophilic silanes do not agglomerate during incorporation into detergents. In addition, use of the silane-zeolite composite allows use of increased amounts of both the zeolite and silicate solids as builders in detergents.

14 Claims, No Drawings

DETERGENT COMPOSITIONS WITH SILANE-ZEOLITE SILICATE BUILDER

This application is a continuation-in-part of our copending application Ser. No. 842,425, filed Oct. 14, 1977 now abandoned.

BACKGROUND OF THE INVENTION

This invention relates to detergent compositions. In particular, it is directed to the use of zeolites and silicates as phosphates replacements in detergents.

Modern household laundry detergents are formulated of a number of diverse ingredients which function together to provide efficient detersive properties under a variety of water and use conditions. In addition, it is necessary that these ingredients be processed readily to provide a uniform, easily stored product that can be utilized by the consumer without difficulty or hazard. Such laundry detergents are most often prepared by spray drying an aqueous slurry of the non-volatile ingredients to produce beads or granules. Builders are incorporated into such detergents to boost cleaning power. Phosphates, especially sodium tripolyphosphate, have proven to be desirable builders, being able to sequester hard water ions and contribute alkalinity to the system. Recently, the desirability of replacing all or part of the phosphates in certain detergent formulations has become apparent. Zeolites have been suggested and tested as ion exchange agents to replace the sequestering power of the phophates. Numerous patents have issued disclosing detergents of this nature including U.S. Pat. Nos. 3,985,669; 4,000,094; 4,019,999; 4.066,394; and 4,072,621.

Several problems are encountered when zeolites are incorporated into detergents. Some zeolites have ion exchange rates that are too slow for proper performance. German Pat. Nos. DS 2,510,741 and DS 2,510,742 and U.S. Pat. No. 4,040,972 teach that zeolites modified with up to 30% phosphate or tartrate provide more rapid inactivation of the hard water ions. It is understandable that modification of zeolites with what are essentially sequestering agents should improve their performance in this area.

In addition, it has been found that while detergents formulated with zeolites of small particle size and a high ion exchange rate have good detersive action, the zeolites tend to agglomerate during industrial preparation of the detergents. It is probable that this agglomeration takes place in the spray dryer and results from the interaction of the zeolite with other detergent ingredients. These agglomerates lead to decreased performance and deposits on the fabric being laundered.

These and other problems prevent the use of significant amounts of alkali metal silicate in detergents formulated with zeolite builders. U.S. Pat. Nos. 3,985,669; 4,000,094; 4,019,999; and 4,066,394 teach that only a limited amount of silicate solids, 3% or less can be incorporated into zeolite built detergents. These patents indicate that larger amounts of silicate result in a decrease in the ion exchange capacity of the zeolite and also decreases the rate of hardness ion depletion. It would be advantageous to provide zeolite built detergents that contain substantially more than 3% of silicate solids since they provide important detersive and process contributions. Soluble silicates provide added alkalinity, supplemental builder properties, corrosion protection, bead formation and other functionalities which make detergent processing and use easier.

U.S. Pat. application Ser. No. 833,122, filed Sept. 14, 1977, now U.S. Pat. No. 4,138,363, teaches the preparation of silane-hydrated zeolite composites. This application is hereby incorporated by reference.

It is an object of this invention to provide zeolite built detergents formulated with substantial amounts of soluble silicate solids. It is also an object of this invention to provide zeolite built detergents with high silicate levels that do not agglomertate in processing, storage or use.

SUMMARY OF THE INVENTION

We have found that silane-zeolite composites with fully hydrated zeolites can be used as builders in detergents formulated with high levels of alkali metal silicate solids. Silane-zeolite composites do not interact with high levels of silicate in the detergent to form agglomerates during processing in such a way that the ion exchange sites are blocked. Therefore, sufficient silicate can be included in the formulation to realize the builder properties inherent in silicates.

THE INVENTION

The detergent compositions of our invention use hydrated, hydrophilic silane-zeolite composites as part of the builder. These materials reduce the hard water ions in the laundering environment by ion exchange. The silane-zeolite is compatible with most surface active agents so that many detergent actives may be utilized in the compositions. High levels of water-soluble silicate solids provide additional detersive, building and processing advantages. In addition, our detergent may contain anti-rediposition agents, optical brighteners, auxiliary builders, bulking agents and other detergent additives.

The insoluble silane-zeolite composites function as builders by ion exchange hard water ions thereby removing these ions from activity in the laundering batch. These composites comprise 0.05 to 3.35% hydrophilic silane, 15 to 35% water and the remainder to 100% is the crystalline alumino-silicate in the sodium form.

A variety of synthetic and natural zeolites are useful as the substrate and main ingredient of our builder material. In general, synthetic zeolites are more readily available and have more consistent properties. Sodium alumino-silicates such as those described in U.S. Pat. Nos. 2,882,243-4; 3,012,853; 3,130,007; 3,329,628; 3,720,756; and 3,808,326, among others, are suitable. We usually use silane-zeolite composites wherein the zeolite conforms to the formula:

$$Na_x[(AlO_2)_x(SiO_2)_y]zH_2O$$

In this formula, x and y are integers; the molar ratio of x to y is in the range 0.1 to 1.1 and z is an integer from about 8 to 250. In general, z is an integer such that the water content is about 15 to 35% by weight of the zeolite. We also use a zeolite wherein x and y are 12 and z is about 20. Another useful zeolite has composition wherein x is an integer between 80 and 96, y is an integer between 112 and 96 and z is between 220 and 270.

The silane portion of the builder composite is an organo-silicon compound with usually contains chemical groups of at least 2 different reactivities attached to a silicon atom. One group is attached to the silicon in a stable manner and provides the enduring functional nature of the entity. The other group can easily hydrolyze providing active silanol sites which can condense with other hydroxyl groups such as those on the surface of a zeolite. The stable group on the silane is hydrophilic so that the builder composite can function in an aqueous environment. Such hydrophilic functional groups include among others, acrylates, epoxies, amines and carboxylates.

The builder composite can be prepared by placing the hydrated zeolite and the silane in a closed container and assuring that the components are well mixed in contact for a sufficient amount of time for the reaction to be completed. An alternative preparation involves slurrying the zeolite with a water miscible organic solvent, adding the silane and mixing the slurry. The solvent is then removed by filtration and/or evaporation. These reactions should be carried out at temperatures below about 100° C. More detailed descriptions of the preparation of these materials is given in a co-pending application U.S. Ser. No. 833,122, now U.S. Pat. No. 4,138,363, which is hereby incorporated by reference.

Water soluble silicates are important components of our detergent formulations. Inclusion of these materials provides several important properties required for detergent compositions. These include protection of processing equipment and washing machines against corrosive action of the other detergent components, improved granule formation, increased alkalinity and builder properties. In general, it has not been possible to add sufficient silicate to zeolite built detergents to realize or optimize these properties especially the builder properties. We have been able to add sufficient silicate to realize these advantages when the silane-zeolite composite is used. The alkali metal silicates used in our formulations are usually sodium silicates with about 1.0 to 4.0 moles of $SiO_2$ per mole of $Na_2O$. Equivalent potassium and lithium silicates can be used as well. While hydrated and certain anhydrous silicate powders are useful, we usually employ concentrated solutions containing 20 to 50% solids.

The silane-zeolite builder is a white free-flowing, water insoluble powder which is easily combined with other detergent materials to provide excellent heavy duty laundry detergents. It can be dry blended with the appropriate materials to provide the product or it can be slurried with non-volatile detergent components and then spray dried to provide the familiar detergent granules.

The properties of the hydrophilic silane-zeolite allow a large variety of organic surface active agents to be used in our detergent compositions and indeed it appears that any surface active agent that is compatible with high silicate levels is useful. The compositions, properties and preparation of organic surface active agents are well represented in the patent literature and a detailed review of such readily available material will not be undertaken here. We hereinafter disclose examples of certain classes of and individual surfactants that can be used in the detergents of our invention. It is not intended that the scope of our invention be limited to these specific materials, but that equivalent materials also be included.

Anionic surfactants are particularly important in the detergent compositions of our invention. Such anionic materials include, among others, alkali metal soaps of fatty acids, alkali metal salts of alkyl sulfuric acid reaction products, sodium alkyl glyceryl ether sulfonates, succinamates and anionic phosphates, one of the most commly used anionic surfactants is the sodium salt of linear alkyl benzene sulfonate (LAS) wherein the alkyl group contains more than 10 carbon atoms. LAS forms at least a part of many of the surfactant systems used in our detergent compounds and may be the only surfactant used.

Nonionic surfactants are also useful and include, among others, polyethylene oxide condensate of alkyl phenols, condensation products of aliphatic alcohols with ethylene oxide, nonyl phenol-ethylene oxide condensates, amine oxides and posphine oxides.

Ampholytic surfactants such as the aliphatic derivatives of heterocyclic secondary and tertiary amines and zevitterionic surfactants such as derivatives of aliphatic quaternary ammonium compounds are also useful.

Although sufficient silane-zeolite builder and silicate can be used to accomodate any laundering environment it may be desired to include an auxiliary builder in the detergent compositions of our invention. Such auxiliary builders include salts of phosphates, pryophosphates, orthophosphates, polyphosphates, phosphonates, carbonates, and polyhydroxysulfonates, organic sequestering agents such as polyacetates, carboxylates, polyaminocarboxylates and polyhydroxysulfonates are of use in our detergent compositions. Specific examples of useful materials include sodium and potassium salts of tripolyphosphate, pyrophosphate, hexametaphosphate, ethylenediaaminotetraacetic acid, nitrilotriacetic acid, citric acid, citric acid isomers and others.

Our silane-zeolite, silicate built detergents can also include numerous additional detergent ingredients. Antiredeposition agents such as sodium carboxymethyl cellulose prevent certain types of soils from redepositioning on clean fabric. Minor detergent ingredients such as enzymes, optical brighteners and bleaches are included to remove stains and/or improve the appearance of the fabric. Other minor detergent ingredients such as perfumes, anti-caking agents, dyes, colored specks and fabric softeners are added to improve the properties or appearance of the detergent or the fabric. Since detergent actives are effective at low concentrations, it is important the bulking agents be added to the formulation so that measurement of the appropriate dose is facilitated. We have found bulking agents such as sodium sulfates, sodium chloride and other neutral alkali metal salts to be effective.

A number of methods can be employed to prepare the silane-zeolite and silicate built detergents.

The detergent components can be selected for the most part from powdered or granular material. These components are then blended. An alternative method is to form a slurry of detergent components that are not volatile which is then spray dried to provide granules. Another method involves wet mixing of the detergent components with a material that will absorb the water and provide an apparently dry product.

The composition of our silane-zeolite silicate built heavy duty laundry detergent generally comprises:

(a) 8 to 30% by weight of one or more organic surface active agents selected from the group consisting of anionic, nonionic, amphalytic and zwitterionic surfactants;

(b) 13 to 85% by weight of a builder system consisting of:

(1) 5 to 60 parts by weight of a hydrophilic silane-zeolite composite containing 0.05 to 3.35% hydrophilic silane, 15 to 35% water and the balance to 100% crystalline sodium alumino-silicate; and (2) 8 to 25 parts by weight of water soluble alkali metal silicate solids;

(c) 0 to 2% by weight of carboxymethyl cellulose;

(d) 0 to 0.5% by weight of minor detergent ingredients selected from the group consisting of enzymes, optical brighteness, bleaches, perfumes, anti-caking agents, dyes, colored specs and fabric softeners;

(e) 0 to 15% by weight auxiliary builder such as sodium phosphates; and (f) the balance of 100% water and a neutral alkali metal salt as a bulking agent.

As indicated by this general formulation and previous discussion, the essential elements of our detergent are the surface active agents and the builder system consisting of silane-zeolite composite and alkali metal silicate. These elements provide the basic cleaning action while the remaining materials provide various minor conditioning functions directed to the detergent powder or the fabric being laundered.

While detergents with a single surfactant prepared according to the formulation of our invention are satisfactory we have found that combinations of anionic and nonionic surfactants interact well with our unique builder system to remove a wide variety of soils. These detergents would comprise 8 to 25% by weight of an anionic surfactant such as a linear alkyl benzene sulfonate (with about 9 to 15 carbon atoms in the alkyl group (LAS); 4 to 12% of a nonionic surfactant such as the condensation product of an aliphatic alcohol with ethylene oxide; and 23 to 65% of the builder system consisting of 15 to 40 parts by weight of a silane-zeolite and parts by weight of soluble alkali metal silicate solids.

These detergents are dissolved in water, thereby forming a washing bath essentially for cleaning fabrics. The concentration of such a bath would be 0.02 to 0.6% by weight and the pH would be about 8.2 to 10.9. Under these conditions, the silane-zeolite built detergent compositions are efficient in the removal of various types of soils from fabrics.

EXAMPLES

The following Examples illustrate certain embodiments of our invention and are not considered to limit the scope of our invention. The scope of our invention is clearly defined in the claims. All proportions are in parts by weight (pbw) or percent by weight (%) unless otherwise indicated.

Detergency performances at the consumer level is a function of many variables—types of detergents and use level, water hardness, type of soil or stain, type and color of fabric, wash temperature, type of washer, wash load size, agitation and many other variables. A large volume of technical literature is available which describes the many aspects of detergency evaluation and the various methods used to simulate the performance of detergent formulations. We used the Terg-O-Tometer and Spangle-type synthetic sebum-particulate soiled cotton and permapress polyester/cotton fabric for our performance evaluation since this procedure is widely acceptable. (See W. G. Spangler, et al; J. American Oil Chem. Soc. 42, 723 (1965). One hardness level was used, 150 ppm as $CaCO_3$. The performance was measured as change in reflectance on washing, $\Delta$ Rd. A difference of 2.0 units in $\Delta$ Rd is significant at a 95% confidence level.

EXAMPLE 1

A heavy duty laundry detergent was prepared according to the teachings of our invention by forming an aqueous 55% solids slurry of the non-volatile ingredients and spray drying them. The silane-zeolite composite used as gamma-glycidoxypropyltrimethyoxysilane-Zeolite A containing 0.4% silane, 20.2% water and the remainder to 100% sodium alumino silicate. The detergent composition was spray dried under conditions to provide about 10% water in the finished product and had the following composition:

| | |
|---|---|
| LAS (Anionic) | 12% |
| Ethoxylated alcohol (nonionic) | 8% |
| Silane-Zeolite Builder | 30% |
| Silicate Solids (2.4 $SiO_2/Na_2O$) | 20% |
| Tinopal CBS - Optical Brightener (Ciba-Geigg Corp.) | 0.1% |
| CMC anti-redisposition agent | 0.2% |
| Water | 9.9% |
| Sodium Sulfate + minor ingredients | Balance to 100% |

The processing of this material was free from problems. No agglomeration of the material was noted during processing the product, in storage or in use. The detergent was very effective in cleaning solied fabric.

EXAMPLE 2

An attempt was made to prepare a detergent of the same composition as that described in Example 1 except the Zeolite A replaced the silane-zeolite composite. This preparation was only moderately successful. Agglomeration appeared to take place in the crutcher. The product contained visible agglomerates and white particles were seen on dark colored fabrics which had been laundered with this detergent.

EXAMPLE 3

This Example illustrates the preparation of 2 detergent formulations according to the teachings of our invention by dry blending the following ingredients:

| Ingredient | Formulation | 4a | 4b |
|---|---|---|---|
| Ardet ABC (anionic, Ardmore Chem. Co.) dodecylbenzene sulfonate powder, 85% active | (pbw) | 22 | 5 |
| Lanthanol LAL 70 Powder (anionic, Stepan Chem. Co.) sodium laural sulfoacetate, 70% active | (pbw) | | 17 |
| Builder Systems | | | |
| Silane-Zeolite Composite (0.8% gamma-acrylopropylsilane-99.2% Zeolite X, 23.4% $H_2O$) | (pbw) | 25 | 35 |
| Potassium silicate (3.3 $SiO_2/K_2O$, 22% $H_2O$) | (pbw) | 20 | 15 |
| Tinopal CBS | (pbw) | 0.1 | 0.1 |
| CMC | (pbw) | 0.2 | 0.2 |
| Sodium sulfate (bulking agent) | (pbw) | 33 | 28 |

The sodium sulfate and the surfactant are charged to a twin shell blender and blended until uniform. Then, the Tinopal and CMC are added followed by the potassium silicate powder. The silane-zeolite composite is added last and blending is continued until a uniform mixture is obtained. The detergents can be stored readily and are useful in washing soiled fabrics.

EXAMPLE 4

This Example illustrates the preparation of detergent formulations according to the teachings of our invention with various anionic surfactants by the spray drying process described in Example 1. After spray drying, the compositions are:

| INGREDIENT | FORMULATION | 5a | 5b | 5c | 5d |
|---|---|---|---|---|---|
| Altas WA 100 (Atlas Refining Co.) dioctylsulfosuccinate | (pbw) | 22 | — | — | 10 |
| Dergolene (Arkansas Chem. Inc.) sulfated ethoxylated alcohol | (pbw) | — | 18 | — | — |
| Carsonol SLS (Carson Chem. Co.) sodium laural sulfate | (pbw) | — | — | 27 | — |
| Empopon L (Emkaz Chem. Co.) amide sulfonate | (pbw) | — | — | — | 17 |
| Builder Systems | | | | | |
| Silane-zeolite composite | (pbw) | 25 | 25 | 30 | 20 |
| (0.8% gama-arylopropylsilane-99.2% Zeolite X, 23.4% $H_2O$) | (pbw) | | | | |
| Sodium Silicate Solids (2.0 $SiO_2/K_2O$) | (pbw) | 25 | 15 | 20 | 15 |
| Tinopal CBS | (pbw) | 0.1 | 0.1 | 0.1 | 0.1 |
| CMC | (pbw) | 0.2 | 0.2 | 0.2 | 0.2 |
| Water | (pbw) | 9.9 | 10.2 | 10.2 | 10.0 |
| Sodium Sulfate | | 15 | 32 | 13 | 28 |

The detergents are non-agglomerating during processing, storage or during the wash cycle, and are effective in laundering soiled fabric.

EXAMPLE 5

This Example illustrates the preparation of detergent formulations according to the teachings of our invention with various non-ionic surfactants. These compositions are prepared by the spray drying process of Example 1 and after spray drying, the compositions are:

| INGREDIENT | FORMULATION | 6a | 6b | 6c | 6d |
|---|---|---|---|---|---|
| Alkasurf (Alkoril Chem) | (pbw) | 18 | — | — | — |
| Hyonic (Diamond-Shamrock Co.) fatty alkylolamide | (pbw) | — | 15 | — | — |
| Bio-Soft (Stepan Chem. Co.) ethoxylated fatty alcohol | (pbw) | — | — | 15 | — |
| Atlasene 500 c (Atlas Refining Co.) fatty alkylol amide condensate | (pbw) | — | — | — | 17 |
| Builder Systems | | | | | |
| Silane-zeolite composite (0.4% gama-glycidoxypropylsilane-Zeolite A, 20.2% $H_2O$) | (pbw) | 25 | 30 | 25 | 35 |
| Sodium Silicate (2.8 $SiO_2/K_2O$) | (pbw) | 15 | 15 | 12 | 12 |
| Tinopal CBS | (pbw) | 0.1 | 0.1 | 0.1 | 0.1 |
| CMC | (pbw) | 0.2 | 0.2 | 0.2 | 0.2 |
| Water | (pbw) | 10.2 | 10.0 | 10.1 | 9.8 |
| Sodium Sulfate | (pbw) | 32 | 30 | 38 | 26 |

These formulations are non-agglomerating and are effective in laundering soiled fabrics.

EXAMPLE 6

This Example illustrates the preparation of detergent formulations according to the teachings of our invention with amphoteric surfactants. The compositions are prepared by the spray drying method of Example 1. Both compositions were the same as formulation 5*c* except for the surfactant. The surfactant for formulation 7*a* is Deriphat 154, General Mills Chemical Co., disodium salt of N tallow beta amino depropionate. Accobetaine CL, Armstrong Chemical Co., a complex cocobetaine is the surfactant for formulation 7*b*. These formulations are non-agglomerating and are effective in laundering soiled fabrics.

EXAMPLE 7

The detergent performance of our silane-zeolite silicate built detergent was tested as described prior to Example 1. In this evaluation, the specific detergent formulations were designed to show difference in performance rather than suitability for consumer use and as such are not realistic illustration of our invention. These formulations were prepared by successively dissolving or suspending various components in water. In this way, some combinations were obtained that would not be suitable for commercial production. These formulations were prepared with 2 levels of zeolite or silane-zeolite and 2 levels of silicate solids. The compositions were:

No. 1

| | |
|---|---|
| LAS | 18 pbw |
| Sodium Tripolyphosphate | 12 pbw |
| Sodium Silicate (2.4 $SiO_2/Na_2O$) | 10 pbw |
| Zeolite A or Silane-Zeolite A Composite | 20 pbw |
| $Na_2SO_4$ | 35 pbw |

No. 2

| | |
|---|---|
| LAS | 18 pbw |
| Sodium Silicate (2.4 $SiO_2/Na_2O$) | 10 pbw |
| Zeolite or Silane-Zeolite A Composite | 30 pbw |
| $Na_2SO_4$ | 37 pbw |

-continued

| No. 3 | |
|---|---|
| LAS | 18 pbw |
| Sodium Silicate (2.4 $SiO_2/Na_2O$) | 20 pbw |
| Zeolite A or Silane-Zeolite A Composite | 30 pbw |
| $Na_2SO_4$ | 27 pbw |

The formulations were used at 0.15% and 49° C. for cotton and 35° C. for polyester/cotton blend. The results are summarized in Table I.

DETERGENCY PERFORMANCE OF SILANE-ZEOLITE BUILDER
Change in Reflectance of Washing Δ Rd

| | | COTTON | | | POLYESTER/COTTON | | |
|---|---|---|---|---|---|---|---|
| Sample Run | Builder | Form. #1 | Form. #2 | Form. #3 | Form. #1 | Form. #2 | Form. #3 |
| a-2 | Zeolite A | 21.0 | 17.9 | 22.2 | 10.8 | 9.5 | 14.0 |
| a-9 | Zeolite A | 20.5 | 17.6 | 21.5 | 10.9 | 9.4 | 14.3 |
| b-3 | Silane-Zeolite A | 20.7 | 18.3 | 21.4 | 10.1 | 11.3 | 13.1 |
| b-4 | Silane-Zeolite A | 20.1 | 18.6 | 22.5 | 11.9 | 10.4 | 15.7 |
| c-5 | Silane-Zeolite A | 19.7 | 18.4 | 22.8 | 10.4 | 14.0 | 14.4 |
| c-6 | Silane-Zeolite A | 21.0 | 17.8 | 20.7 | 12.2 | 10.7 | 17.7 |
| d-7 | Silane-Zeolite A | 20.4 | 16.8 | 22.4 | 14.4 | 10.9 | 15.0 |
| d-8 | Silane-Zeolite A | 20.9 | 17.9 | 21.5 | 11.6 | 9.3 | 14.2 |

b-3 = 0.2% beta-3,4 epoxycyclohexylethylsilane - 99.8% Zeolite A
b-4 = 0.4% beta-3,4 epoxycyclohexylethylsilane - 99.6% Zeolite A
c-5 = 0.2% gamma-glycidoxypropylsilane - 99.8% Zeolite A
c-6 = 0.4% gamma-glycidoxypropysilane - 99.6% Zeolite A
d-7 = 0.2% gamma aminopropylsilane - 99.8% Zeolite A
d-8 = 0.4% gamma aminopropylsilane - 99.6% Zeolite A These results indicate that the silane-zeolite composites are as effective as zeolite as builder. The results also illustrate an important advantage of our builder system. They show that Formula #3 contain the most effective builder system. This builder system consists of silane-zeolite and a high silicate content. While the results show improved performance for Formula #3 with plain Zeolite A, it must be realized that this formulation cannot be satisfactory prepared in a form acceptable to the producer or consumer.

We claim:

1. A detergent composition comprising:
(a) 8 to 30% by weight of one or more organic surfactants selected from the group consisting of anionic, nonionics and ampholytic surfactants; and
(b) 13 to 85% by weight of a builder system consisting of:
(1) 5 to 60 parts by weight of a hydrophilic silane-zeolite composite containing 0.5 to 3.35% by weight of hydrophilic silane, and the remainder to 100% crystalline sodium alumino silicate containing 15 to 35% water; and
(2) 8 to 35 parts by weight of water soluble alkali metal silicate solids with a molar composition equivalent to 1.0 to 4.0 moles of $SiO_2$ per mole of $Na_2O$.

2. The detergent composition of claim 1 wherein the silane of the silane-zeolite builder has at least one functional group selected from the group consisting of acrylates, epoxies, amines and carboxylates.

3. The detergent composition of claim 1 wherein the zeolite of the silane-zeolite builder has a composition conforming to the formula:

$$Na_x[(AlO_2)_x(SiO_2)_y]zH_2O$$

wherein x and y are integers, the molar ratio of x to y is in the range of 0.1 to 1.1 and z is an integer such that the water content of the zeolite is between 15 and 35%.

4. The detergent composition of claim 3 wherein x and y are 12.

5. The detergent composition of claim 3 wherein x is an integer between 80 and 96 and y is an integer between 112 and 96.

6. The detergent composition of claim 1 wherein the soluble alkali metal silicate solids are sodium silicate solids and have 1.0 to 4.0 mole of $SiO_2$ per mole of $Na_2O$.

7. The detergent composition of claim 1 which also includes 0 to 15% of an auxiliary builder selected from the group consisting of sodium and potassium salts of tripolyphosphate, pyrophosphate, hexametaphosphate, ethylenediaminotetracetic acid, nitrilotriacetic acid, citric acid and citric acid isomers.

8. A detergent composition comprising:
(a) 8 to 25% by weight of an anionic surfactant;
(b) 4 to 12% by weight of a nonionic surfactant; and
(c) 13 to 85% by weight of a builder system consisting of:
(1) 5 to 60 parts by weight of a hydrophilic silane-zeolite composite containing 0.5 to 3.35% by weight of hydrophilic silane, and the remainder of 100% crystalline sodium alumino silicate containing 15 to 35% water; and
(2) 8 to 25 parts by weight of water soluble alkali metal silicate solids with a molar composition equivalent to 1.0 to 4.0 moles of $SiO_2$ per mole of $Na_2O$.

9. The detergent of claim 8 wherein the silane of the silane-zeolite builder has at least one functional group selected from the group consisting of acrylates, epoxies, amines and carboxylates.

10. The detergent of claim 8 wherein the zeolite of the silane-zeolite builder has a composition conforming to the formula:

$$Na_x[(AlO_2)_x(SiO_2)_y]zH_2O$$

wherein x and y are integers; the molar ratio of x to y is in the range of 0.1 to 1.1 and z is an integer such that the water content is between 15 and 35%.

11. The detergent composition of claim 10 wherein x and y are 12.

12. The detergent composition of claim 10 wherein x is between 80 and 96 and y is between 112 and 96.

13. The detergent composition of claim 8 wherein the soluble silicate solids are sodium silicate and have 1.0 to 4.0 moles of $SiO_2$ per mole of $Na_2O$.

14. The detergent composition of claim 8 which also includes 0 to 15% by weight of an auxiliary builder selected from the group consisting of sodium and potassium salts of tripolyphosphate, pyrophosphate, hexametaphosphate, ethylenediaminetetracetic acid, nitrilotriacetic acid, citric acid and citric acid isomers.

* * * * *